(12) United States Patent
Miyata

(10) Patent No.: US 8,139,102 B2
(45) Date of Patent: Mar. 20, 2012

(54) DIGITAL CAMERA

(75) Inventor: Kazunori Miyata, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 896 days.

(21) Appl. No.: 12/186,852

(22) Filed: Aug. 6, 2008

(65) Prior Publication Data

US 2009/0040292 A1 Feb. 12, 2009

(30) Foreign Application Priority Data

Aug. 7, 2007 (JP) ................................. 2007-205384

(51) Int. Cl.
*H04N 5/225* (2006.01)
*G06K 9/32* (2006.01)
(52) U.S. Cl. ......................................... 348/36; 382/294
(58) Field of Classification Search .................... 348/36; 382/284, 294
See application file for complete search history.

(56) References Cited

U.S. PATENT DOCUMENTS

| 5,416,557 | A * | 5/1995 | Nagasaki et al. ............... 396/52 |
| 5,995,108 | A | 11/1999 | Isobe et al. |
| 6,549,681 | B1 * | 4/2003 | Takiguchi et al. ............ 382/294 |
| 7,085,435 | B2 * | 8/2006 | Takiguchi et al. ............ 382/294 |
| 7,139,412 | B2 * | 11/2006 | Kato et al. .................... 382/104 |
| 7,366,360 | B2 * | 4/2008 | Takiguchi et al. ............ 382/284 |
| 7,623,733 | B2 * | 11/2009 | Hirosawa ...................... 382/284 |
| 7,881,559 | B2 * | 2/2011 | Park et al. ..................... 382/284 |
| 7,893,984 | B2 * | 2/2011 | Ikeda ....................... 348/333.12 |
| 2002/0001036 | A1 | 1/2002 | Kinjo |
| 2004/0100565 | A1 * | 5/2004 | Chen et al. ................. 348/229.1 |
| 2006/0181619 | A1 | 8/2006 | Liow et al. |
| 2007/0240292 | A1 | 10/2007 | Maeiwa |
| 2007/0269198 | A1 * | 11/2007 | Park et al. ..................... 396/322 |
| 2008/0043093 | A1 * | 2/2008 | Song ............................... 348/39 |
| 2008/0074489 | A1 * | 3/2008 | Zhang et al. .................... 348/36 |
| 2008/0192125 | A1 * | 8/2008 | Kang et al. ................. 348/222.1 |

FOREIGN PATENT DOCUMENTS

| CN | 1854887 A | 11/2006 |
| CN | 1981077 A | 6/2007 |
| JP | 2-178646 A | 7/1990 |
| JP | 5-268518 A | 10/1993 |
| JP | 6-105193 A | 4/1994 |
| JP | 8-171382 A | 7/1996 |
| JP | 9-6986 A | 1/1997 |
| JP | 10-115879 A | 5/1998 |
| JP | 11-075108 A | 3/1999 |
| JP | 11-088731 A | 3/1999 |
| JP | 11-88731 A | 3/1999 |
| JP | 11-298765 A | 10/1999 |

(Continued)

OTHER PUBLICATIONS

Chinese Office Action dated Nov. 10, 2011, issued in corresponding Chinese Patent Application No. 200810146025.7, with partial English translation.*

(Continued)

*Primary Examiner* — Douglas Blair

(57) ABSTRACT

A digital camera regards a part of a preceding photograph image as a guide image, and combines the guide image with a through image in shooting a succeeding photograph image. At this time, a transmittance of the guide image is set according to a luminance evaluation value at a time when the preceding photograph image is shot.

5 Claims, 3 Drawing Sheets

FOREIGN PATENT DOCUMENTS

| | | |
|---|---|---|
| JP | 2001-169151 A | 6/2001 |
| JP | 2001-333327 A | 11/2001 |
| JP | 2003-61110 A | 2/2003 |
| JP | 2006-174332 A | 6/2006 |
| JP | 2006-295746 A | 10/2006 |

OTHER PUBLICATIONS

Chinese Office Action dated Mar. 1, 2010, issued in corresponding Chinese Patent Application No. 200810146025.7.

* cited by examiner

DIGITAL CAMERA

CROSS REFERENCE OF RELATED APPLICATION

The disclosure of Japanese Patent Application No. 2007-205384 filed on Aug. 7, 2007 is incorporated herein by reference.

BACKGROUND OF THE INVENTION

1. Field of the Invention

The present invention relates to a digital camera. More specifically, the present invention relates to a digital camera capable of taking pictures for connecting or combining a photograph image previously shot and a photograph image next shot like a panoramic shooting.

2. Description of the Related Art

In one example of such a kind of conventional apparatus, an imaging condition, such as an aperture value, a shutter speed, a zoom point, a focus distance, etc. at a time that a template image was shot by a user has been recorded, and the imaging condition can be referred when the user monitors the template image. This makes it possible to produce a combined image whose juncture is least noticeable even when a shooting situation is changed during a divisional shooting.

In the related art, the transmittance of the template image is fixedly decided without exception irrespective of a situation of the object, an imaging condition, and so on. This may make it difficult to view a through image and a combined image depending on a luminance level of the through image.

SUMMARY OF THE INVENTION

Therefore, it is a primary object of the present invention to provide a novel digital camera.

According to one aspect, the present invention is a digital camera which displays on a monitor a part of a preceding photograph image previously shot as a guide image for shooting a succeeding photograph image so as to be overlapped with a through image comprises a setter for setting transmittance of the guide image in accordance with a luminance when the preceding photograph image is shot.

In one embodiment according to this aspect to be described later in detail, a digital camera (10: reference numeral exemplifying corresponding parts in the embodiment, and the same is applicable hereafter) includes an imaging device (18), a raw image signal is output from the imaging device (18), and a camera processing circuit (20) produces digital image data on the basis of the raw image signal. A through image is displayed on a monitor (30) according to the digital image data.

When a shutter button included in an operating device (16) is pushed, a processor (12) calculates a luminance evaluation value (AE), for example, of the through image, that is, the photograph image at that time to store the same in an internal memory (not illustrated), for example, and stores data of the through image, that is, the photograph image when the shutter button is pushed in an SDRAM (24) as an internal memory or a memory card (32) as a recording medium.

The processor (12) cuts a part of the photograph image to store the same in an SDRAM (26) as a guide image.

For a next shooting, the processor (12) combines a next through image for shooting a succeeding photograph image and the guide image on the basis of the aforementioned luminance evaluation value according to the transmittance decided in a transmittance table (table 1) to display the resultant image on the monitor (30).

According to this embodiment, the transmittance of the guide image to be overlapped or combined with the through image for the succeeding photograph image is set on the basis of the luminance of the preceding photograph image, and therefore, when the luminance of the preceding photograph image is high, the transmittance of the guide image is set to be made small, and when the luminance of the preceding photograph image is low, the transmittance of the guide image is set to be made large.

In the panoramic shooting, a succeeding photograph image is basically shot temporally close to a preceding photograph image, and therefore, the luminance when the succeeding photograph image is shot is considered not to be drastically changed from the luminance when the preceding photograph is shot. Thus, if the transmittance of the guide image is set in correspondence with the luminance when the preceding photograph image is shot, when the guide image and the through image for succeeding photograph image are combined, both of the luminances are conformed to each other, and therefore, the guide image is never merged with the through image for succeeding photograph image, and vice versa. This can solve the problem of difficulty of viewing the through image, the guide image and a further combined image depending on a luminance level of the through image.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
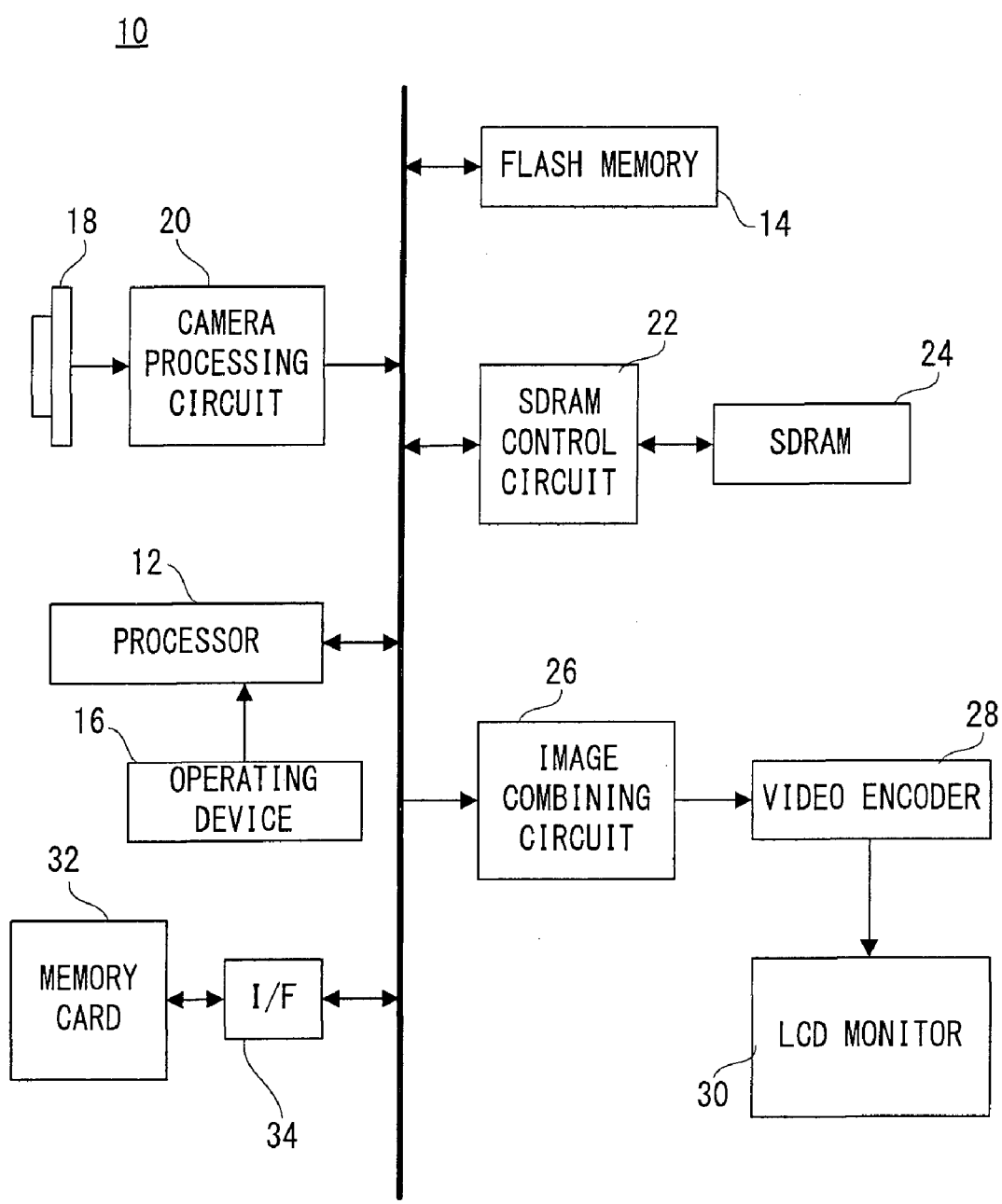
FIG. 1 is a block diagram showing a configuration of one embodiment of the present invention.

Referring to FIG. 1, a digital camera 10 of one embodiment of the present invention includes a CPU, a microcomputer, or a processor 12. The processor 12 exerts control over the digital camera 10 according to program data and set data which are set in the flash memory 14 in advance, for example.

When a camera mode is set by a mode setting means (button) included in an operating device 16, an imaging device 18 and a camera processing circuit 20 are activated by the processor 12. It should be note that the operating device 16 is intended to include all the operation switches and buttons for setting a mode and taking a picture in accordance with an artificial operation by the user.

The imaging device 18 outputs one frame of a raw image signal (electric charge) corresponding to an optical image of an object scene, and the camera processing circuit 20 generates digital image data being a digital signal on the basis of the raw image signal. The digital image data is stored as image data for through image in an SDRAM 24 by an SDRAM control circuit 22.

The image data for through image read from the SDRAM 24 is applied to a video encoder 28 through an image combining circuit 26. The image combining circuit 26 includes a VRAM, for example, develops two image data to be combined in the VRAM, and combines the images by performing addition for each corresponding pixels. However, if there is no image data to be combined, without the combination processing being executed, the image data for through image read from the SDRAM 24 is applied to the video encoder 28 without change. The video encoder 28 generates a composite image signal in an NTSC system on the basis of the image data for through image output from the image combining circuit 26, and applies the same to an LCD monitor 30. Accordingly, at this time, a through image is displayed on the LCD monitor 30 as it is. The digital image data for through image is stored in the SDRAM 24 for each frame, and read at a next frame so as to be displayed.

When a shooting operation is performed according to an operation of a shutter button (not illustrated) included in the operating device 16, the image data for through image at this time is stored as image data of a photograph image in the SDRAM 24 by the SDRAM control circuit 22.

The photograph image data stored in the SDRAM 24 may also be recorded in a memory card 32. That is, the digital camera 10 has a slot (not illustrated) for detachably loading the memory card 32, and when the memory card 32 is loaded into the slot, the processor 12 can access the memory card 32 through an I/F circuit 34, and store the photograph image data as necessary. As one example, the image data is recorded in a file format in the memory card 32. That is, an image file storing the image data having been shot is recorded in the memory card 32.

In FIG. 1 embodiment, when a panoramic mode is set in accordance with an operation of a mode setting button (not illustrated) included in the operating device 16, it is possible to shoot a panoramic combined photograph PP shown in FIG. 2(F), and this panoramic combined photograph PP is produced by connecting (combining) in a lateral direction three successive photograph images P1, P2 and P3.

Figure 2:
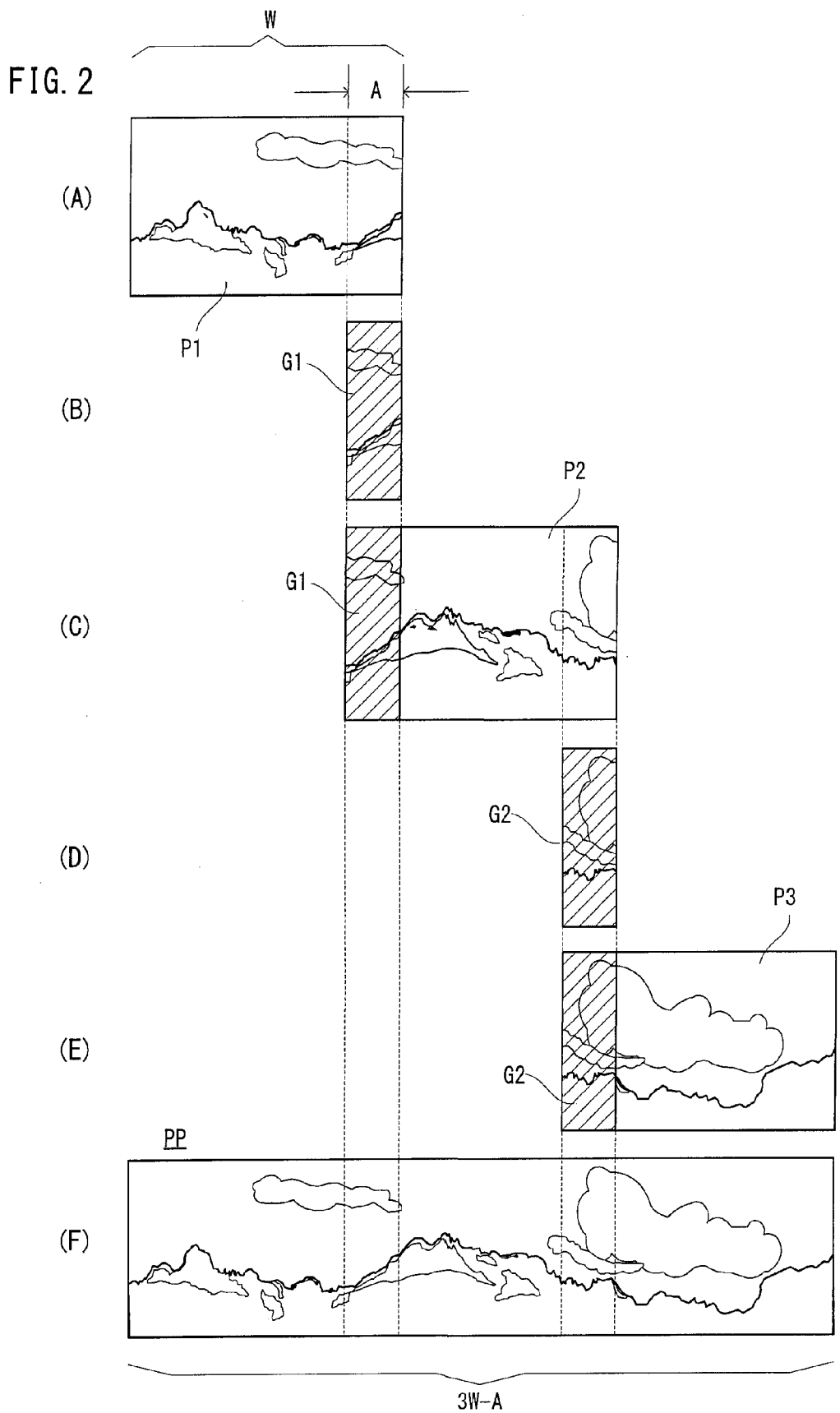
FIG. 2 is an illustrative view showing a panoramic mode in FIG. 1 embodiment.

In a case of FIG. 2, a first photograph image (preceding photograph image) P1 shown in FIG. 2(A) is initially shot at a predetermined angle of view W.

Then, an image of a part of the right end of the preceding photograph image P1 (part of width shown by a reference character A in FIG. 2(A)) is cut out in a vertical direction to produce a guide image G1 shown in FIG. 2(B).

When a succeeding photograph image P2 is shot, the guide image G1 is overlapped with a left end of the through image at this time as shown in FIG. 2(C) to display a combined image between the through image and the guide image on the LCD monitor 30 (FIG. 1). The guide image G1 is displayed for an alignment between the preceding photograph image P1 and the succeeding photograph image P2. When shooting the succeeding photograph image P2, the user may decide the direction of the camera in a lateral direction such that the guide image G1 displayed in an overlapped manner with the left end of the through image in shooting the succeeding photograph image and an actual object are coincident. However, even when the guide image is displayed so as to be overlapped with the through image, it is possible to take a picture without complying with the guide image.

When the second photograph image P2 is shot, a part of the right end of the photograph image is similarly cut out to produce a guide image G2. When a succeeding (third) photograph image P3 is shot, the guide image G2 is overlapped with the left end of the through image for the succeeding photograph image P3 to display a combined image on the LCD monitor 30.

When the three successive photograph images P1, P2 and P3 having the same angle of view W are shot, the processor 12 produces a panoramic combined image for panoramic combined photograph PP as shown in FIG. 2(F) according to an instruction from the user (through the operating device 16).

It should be noted that in this embodiment, as described above, the first photograph image P1 and the second photograph image P2 share the partial image corresponding to the guide image G1, and the second photograph image P2 and the third photograph image P3 share the partial image corresponding to the guide image G2, so that as to the panoramic combined image combined in a panorama as shown in FIG. 2(F), a panoramic combined image narrower by the width A of the one guide image than the total angle of views 3 W of three sheets of the photograph images is formed.

Figure 3:
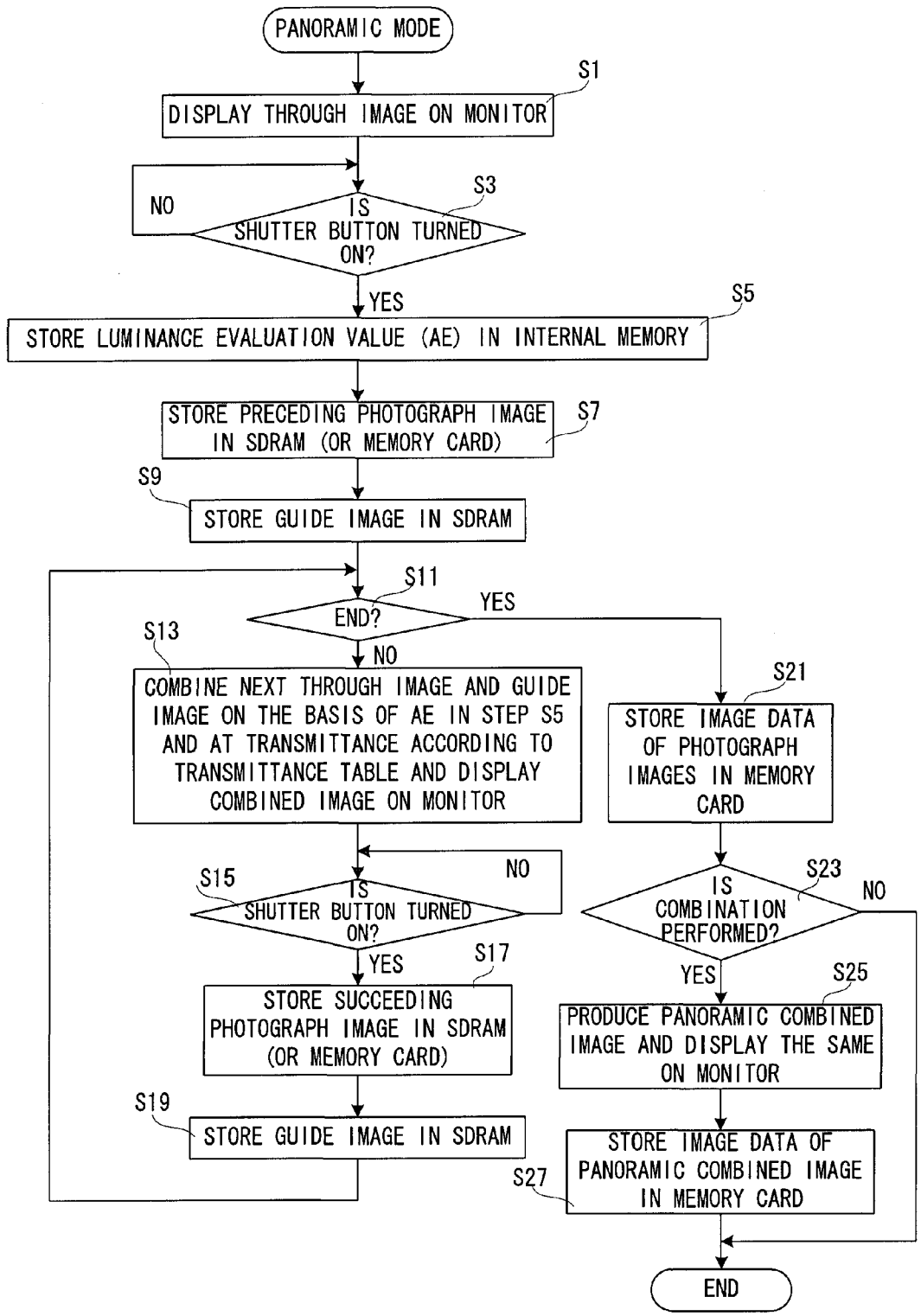
FIG. 3 is a flowchart showing an operation of the panoramic mode in FIG. 1 embodiment.

Next, with reference to FIG. 2 and FIG. 3, an operation of FIG. 1 embodiment when the user sets the panoramic mode by operating the operating device is explained.

In a first step S1 in FIG. 3, the processor 12 displays a through image on the LCD monitor 30 according to the digital image data output from the camera processing circuit 20. Here, the digital image data for through image is alternately written to the SDRAM 24 every frame, and read to be displayed as described above.

Succeedingly, the processor 12 determines whether or not the user operates the shutter button included in the operating device 16 in a step S3. When the shutter button is turned on by the user, the processor 12 stores a luminance evaluation value (AE) at this time in an internal memory (not illustrated) of the processor 12 in a next step S5. It should be noted that as a method of evaluating the luminance evaluation value, a method of integrating Y signals of all the pixels by one frame when the shutter button is pushed and calculating an average value among them, and a method of setting a part of the object scene as a luminance evaluation area, integrating Y signals of all the pixels within the luminance evaluation area by one frame and averaging them are conceivable, but an arbitrary method is available for the method of obtaining the luminance evaluation value.

In a next step S7, the processor 12 stores the image data for through image when the shutter button is turned on as photograph image data in the SDRAM 24. Here, the photograph image may be stored in the memory card 32.

In a succeeding step S9, the processor 12 cuts out a part of a preceding photograph image P1 shown in FIG. 2(A) to produce a guide image G1 as shown in FIG. 2(B), and stores the image data of the guide image G1 in the SDRAM 24.

In a succeeding step S11, the processor 12 determines whether or not an end operation is performed by the operating device 16. When "NO" is determined in the step 11, a through image when a succeeding photograph image P2 is shot and the guide image G1 are combined (overlapped) with each other and displayed on the LCD monitor 30 as shown in FIG. 2(C) on the basis of the luminance evaluation value evaluated in the step S5 and with reference to a transmittance setting table shown in a table 1 in a next step S13.

TABLE 1

|  | Luminance evaluation value | | | | |
| --- | --- | --- | --- | --- | --- |
|  | ≧40 | 41-89 | 90-110 | 111-159 | 160≦ |
| Luminance level | 1 | 2 | 3 | 4 | 5 |
| Transmittance [%] | 70 | 60 | 50 | 40 | 30 |

As shown in the table 1, in this embodiment, the luminance evaluation value evaluated in the step S5 is classified into five luminance levels 1 to 5. For example, when the luminance evaluation value (AE) is equal to or smaller than 40, the luminance level is "1", and when the luminance evaluation value is equal to or larger than 160, the luminance level "5" is assigned. Then, when the luminance evaluation value falls within the range of 41 to 89, the luminance level "2" is assigned, when the luminance evaluation value falls within the range of 90 to 110, the luminance level "3" is assigned, and when the luminance evaluation value falls within the range of 111 to 159, the luminance level "4" is assigned. That is, in this embodiment, the luminance evaluation value is classified into five stages, and the transmittance of the guide image G is stepwise set for every luminance level. When the luminance level is "1", the transmittance of the guide image G is set to be 70%, when the luminance level is "2", it is set to be 60%, when the luminance level is "3", it is set be 50%, when the luminance level is "4", it is set to be 40%, and when the luminance level is "5", it is set to be 30%, for example.

In this embodiment, as shown in the table 1, the transmittance of the guide image is set in proportion to the luminance evaluation value of the preceding photograph image, but the specific values as described above are merely one example, and the important thing is to set the transmittance of the guide image in correspondence with the luminance evaluation value of the preceding photograph image.

In the step S13, when the user pushes the shutter button (not illustrated) in a state that the through image for the second photograph image P2 is displayed together with the guide image G1, "YES" is determined in a step S15, and the processor 12 stores the image data for through image at that time in the SDRAM 24 (or memory card 32) as image data of the photograph image P2 (step S17) similar to the step S7.

Then, in a step S19, a part of the photograph image P2 is cut out to produce a guide image G2, and the image data of the guide image G2 is stored in the SDRAM 24 similar to the preceding step S9.

Returning to the step S11, the processor 12 determines whether or not an end operation is performed. In a case that three sheets of photograph images are successively shot as shown in FIG. 2, "NO" is determined in the step S11, and therefore, the process in the step S13 is executed again such that the guide image G2 is displayed to be overlapped with a through image for shooting a succeeding photograph image P3 with the transmittance corresponding to the luminance of the first photograph image P1 similar to the foregoing, and then, steps S15-S19 are repetitively executed. That is, in this embodiment, when three sheets or more photograph images are shot, the transmittances of the guide image of the second sheet onward are set according to the luminance level of the first photograph image, and therefore, it is only necessary to evaluate the luminance when the first photograph image is shot (the shutter button is operated), capable of being freed from the disadvantage of evaluating a luminance every shooting.

In the panoramic shooting, a succeeding photograph image is shot temporally close to a preceding photograph image, and therefore, the succeeding photograph image is considered not to be drastically changed from the preceding photograph in terms of the luminance. Thus, if the transmittance of the guide image is set in correspondence with the luminance of the preceding photograph image, when the guide image and the through image for succeeding photograph image shooting are combined, both of the luminances are conformed to each other, and therefore, the guide image is never merged into the through image for succeeding photograph image, or a part of the through image is never merged into the guide image, capable of solving the problem of difficulty of viewing each of the through image, the guide image, and the combined image.

However, if necessary, a plurality number of luminance evaluations are performed, and in each case, the transmittance of the guide image may variably be set.

When the user operates the operating device 16 to instruct an end of the panoramic shooting, the processor 12 stores all the photograph images (photograph image P1, P2 and P3 in this embodiment) in the memory card 32 in a next step S21.

Next, in a step S23, the processor 12 determines whether or not a combination instruction button (not illustrated) included in the operating device 16 is operated by the user, that is, whether or not the user desires a panoramic image combination.

If "YES" is determined in the step S23, the processor 12 produces a panoramic combined image obtained by combining the three photograph images in a lateral direction as described above and displays the same on the LCD monitor 30 in a next step S25, and stores the image data of the panoramic combined image in the memory card 32 in a step S27.

However, if "NO" is determined in the step S23, that is, if the user does not desire the panoramic image combination, the process is directly ended. In this case, if the user detaches the memory card 32 from the digital camera 10, and loads the memory card 32 into a slot of a computer (not illustrated), for example, to input the image data of the photograph images to the computer, panoramic image combining processing described before can be executed on the computer.

Furthermore, in the above-described embodiment, the panoramic mode for connecting or combining a plurality of photograph images in a lateral direction is explained, but the present invention contains a panoramic mode for connecting or combining a plurality of photograph images being continuous in a longitudinal direction.

In a case that a plurality of photograph images are made continuous in the longitudinal direction, if the camera is gradually faced upward or displaced upward, the guide image is cut out in the horizontal direction by a predetermined width at the upper end of the preceding photograph image to produce a guide image, and the guide image may be displayed so as to be overlapped with a lower end of a through image in a succeeding photograph image shooting. If the camera is gradually faced downward or displaced downward for shooting, the guide image is produced by cutting out the lower end of the preceding photograph image, and the guide image may be overlapped with an upper end of a through image in a succeeding photograph image shooting.

In addition, in the above-described embodiment, the digital camera 10 is explained to have not only a function of shooting a panoramic (lateral/longitudinal) photograph image, but also a function of connecting and combining panoramic photograph images to produce a panoramic combined image. However, the present invention can also be applied to a digital camera only having a function of shooting a panoramic photograph image and not having a panoramic image combining function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera which displays on a monitor a part of a preceding photograph image previously shot as a guide image for shooting a succeeding photograph image so as to be overlapped with a through image comprises a setter that sets transmittance of said guide image in accordance with a luminance level at a time that said preceding photograph image is shot, wherein said transmittance is set to a smaller percentage when said luminance level is at a high and the transmittance is set to a larger percentage when said luminance level is at a low.

2. A digital camera according to claim 1, wherein said luminance level at the time that said preceding photograph image is shot is classified into a plurality of levels, each of said plurality of levels identifying the value that said setter sets as said transmittance of said guide image.

3. A digital camera according to claim 2, further comprising a combiner for combining said preceding photograph image and said succeeding photograph image to produce a panoramic combined image.

4. A digital camera according to claim 2 or 3, wherein said transmittance setter sets transmittance of a guide image for a second sheet onward according to the luminance level when a first photograph image is shot in a case that three or more photograph images are shot.

5. A control method of a digital camera which displays on a monitor a part of a preceding photograph image previously shot as a guide image for shooting a succeeding photograph image so as to be overlapped with a through image, including:
    a setting step that sets transmittance of said guide image in accordance with a luminance level at a time that said preceding photograph image is shot, said transmittance being set to a smaller percentage when said luminance level is at a high and the transmittance being set to a larger percentage when said luminance level is at a low.

\* \* \* \* \*